US012809112B2

(12) United States Patent
Lin et al.

(10) Patent No.: US 12,809,112 B2
(45) Date of Patent: Nov. 24, 2026

(54) SENSOR LENS ASSEMBLY AND HOUSING THEREOF

(71) Applicant: TONG HSING ELECTRONIC INDUSTRIES, LTD., Taoyuan City (TW)

(72) Inventors: Tsen-Yi Lin, Taoyuan City (TW); Cheng-Chang Wu, Taoyuan City (TW); Li-Chun Hung, Taoyuan City (TW)

(73) Assignee: TONG HSING ELECTRONIC INDUSTRIES, LTD., Taoyuan City (TW)

( * ) Notice: Subject to any disclaimer, the term of this patent is extended or adjusted under 35 U.S.C. 154(b) by 224 days.

(21) Appl. No.: 18/810,523

(22) Filed: Aug. 21, 2024

(65) Prior Publication Data

US 2025/0355213 A1 Nov. 20, 2025

(30) Foreign Application Priority Data

May 20, 2024 (TW) ................................ 113118519

(51) Int. Cl.
*G02B 7/02* (2021.01)
*G02B 5/00* (2006.01)

(52) U.S. Cl.
CPC ................ *G02B 7/02* (2013.01); *G02B 5/003* (2013.01)

(58) Field of Classification Search
None
See application file for complete search history.

(56) References Cited

U.S. PATENT DOCUMENTS

| | | | | |
|---|---|---|---|---|
| 2015/0326766 | A1* | 11/2015 | Czepowicz | G03B 17/12 348/360 |
| 2019/0037129 | A1* | 1/2019 | Wang | G02B 7/02 |
| 2022/0066182 | A1* | 3/2022 | Büeler | G02B 3/14 |
| 2022/0373804 | A1* | 11/2022 | Noui | H04N 9/3152 |
| 2022/0390703 | A1* | 12/2022 | Chang | H04N 23/54 |

* cited by examiner

*Primary Examiner* — Sharrief I Broome
*Assistant Examiner* — Journey F Sumlar
(74) *Attorney, Agent, or Firm* — Li & Cai Intellectual Property Office

(57) ABSTRACT

A sensor lens assembly and a housing thereof are provided. The sensor lens includes a circuit board, a sensing module mounted onto the circuit board, and a lens lid that is fixed to the circuit board and that covers the sensing module. The lens lid includes a bottom frame fixed to the circuit board, a top frame fixed to the bottom frame, and at least one lens that is assembled in the top frame. The bottom frame includes at least one one-way mirror that is a ring-shaped structure surrounding the sensing module. When light enters into the space and travels in the at least one one-way mirror by passing through the at least one lens, the light is reflected in the at least one one-way mirror for multiple times.

10 Claims, 7 Drawing Sheets

SENSOR LENS ASSEMBLY AND HOUSING THEREOF

CROSS-REFERENCE TO RELATED PATENT APPLICATION

This application claims the benefit of priority to Taiwan Patent Application No. 113118519, filed on May 20, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a camera lens, and more particularly to a sensor lens assembly and a housing thereof.

BACKGROUND OF THE DISCLOSURE

A conventional sensor lens assembly can easily have a flare phenomenon generated from light traveling onto an inner side of a housing thereof. However, developments to the conventional sensor lens assembly have always been limited to structural design of a sensing module thereof for attempting to improve upon the flare phenomenon.

SUMMARY OF THE DISCLOSURE

In response to the above-referenced technical inadequacies, the present disclosure provides a sensor lens assembly and a housing thereof for effectively improving on the issues associated with conventional sensor lens assemblies.

In order to solve the above-mentioned problems, one of the technical aspects adopted by the present disclosure is to provide a sensor lens assembly, which includes a circuit board, a sensing module, and a lens lid. The sensing module includes a sensor chip, a ring-shaped supporting layer, and a light-permeable layer. The sensor chip is mounted on and electrically coupled to the circuit board. Moreover, a top surface of the sensor chip has a sensing region and a carrying region that is arranged outside of the sensing region. The ring-shaped supporting layer is disposed on the carrying region and surrounds the sensing region. The light-permeable layer is disposed on the ring-shaped supporting layer. The lens lid includes a bottom frame, a top frame, and at least one lens. The bottom frame is fixed onto the circuit board and includes at least one one-way mirror in a ring-shaped arrangement. The sensing module is located in a space surrounded by the at least one one-way mirror. The top frame is fixed to the bottom frame. The at least one lens is assembled in the top frame and faces toward the sensing region. The lens lid and the circuit board jointly define an enclosed arrangement space that receives the sensing module therein. When light travels into the at least one one-way mirror by passing through the at least one lens and the enclosed arrangement space, the light is reflected in the at least one one-way mirror for multiple times.

In order to solve the above-mentioned problems, another one of the technical aspects adopted by the present disclosure is to provide a housing of a sensor lens assembly, which includes a circuit board and a lens lid. The lens lid includes a bottom frame, a top frame, and at least one lens. The bottom frame is fixed onto the circuit board and includes at least one one-way mirror in a ring-shaped arrangement. The top frame is fixed to the bottom frame. The at least one lens is assembled in the top frame. The lens lid and the circuit board jointly define an enclosed arrangement space. When light travels into the at least one one-way mirror by passing through the at least one lens and the enclosed arrangement space, the light is reflected in the at least one one-way mirror for multiple times.

Therefore, any one of the sensor lens assembly and the housing in the present disclosure is provided with the at least one one-way mirror, so that after the light traveling in the enclosed arrangement space enters into the at least one one-way mirror, the light is limited and restricted in the at least one one-way mirror, thereby effectively preventing a flare phenomenon from being generated.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
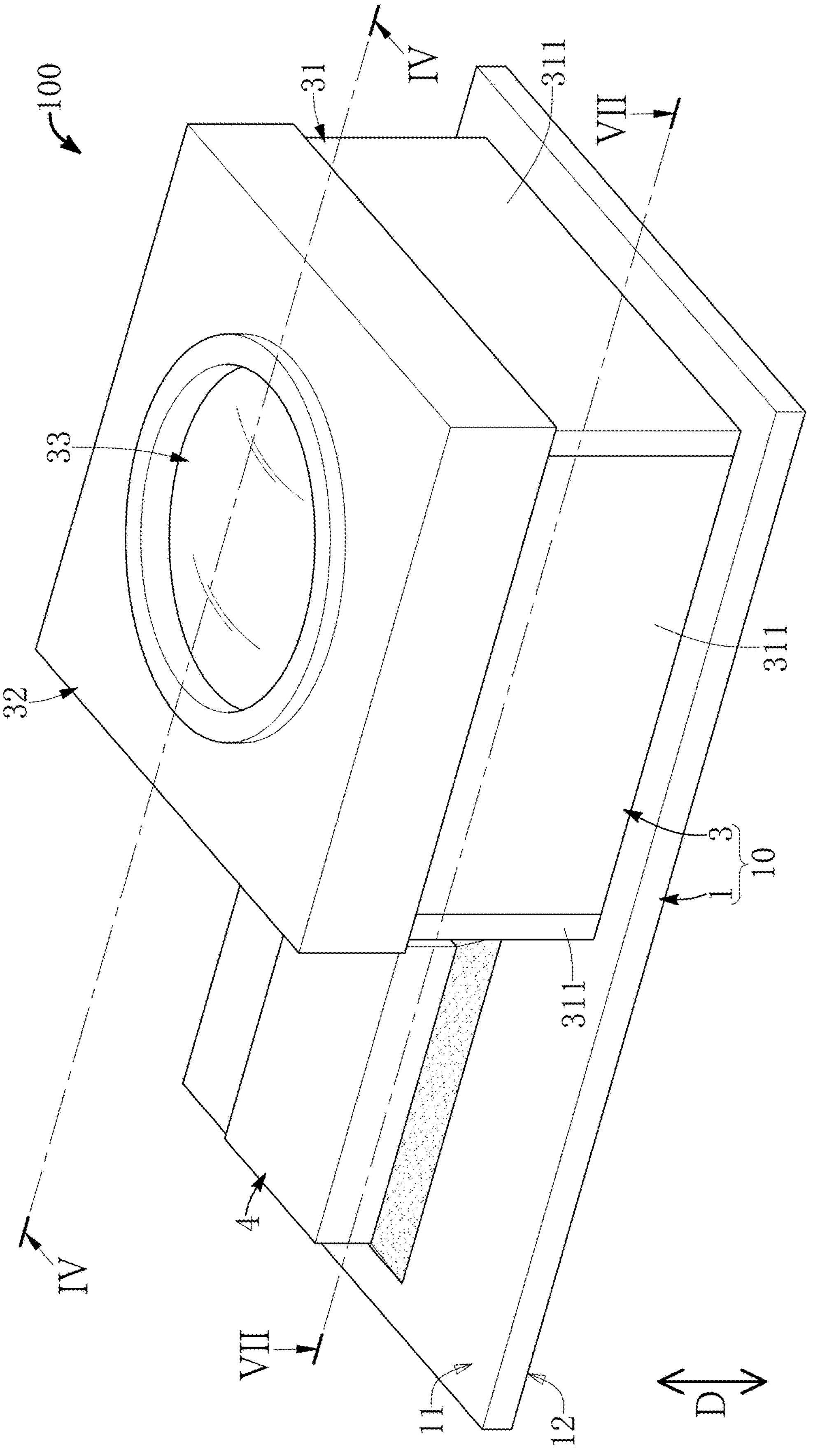
FIG. 1 is a schematic perspective view of a sensor lens assembly according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
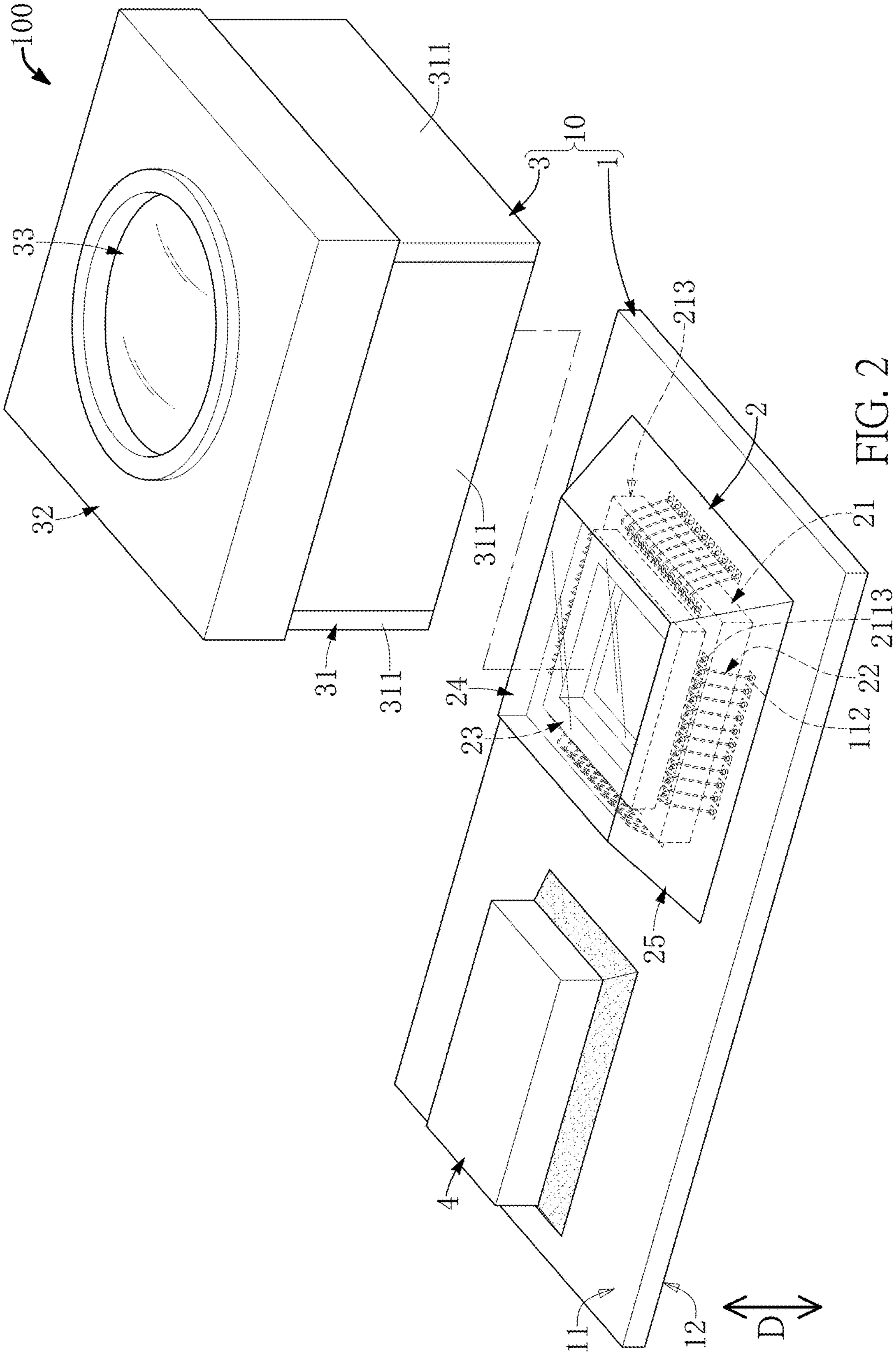
FIG. 2 is a schematic exploded view of FIG. 1.
Figure 3:
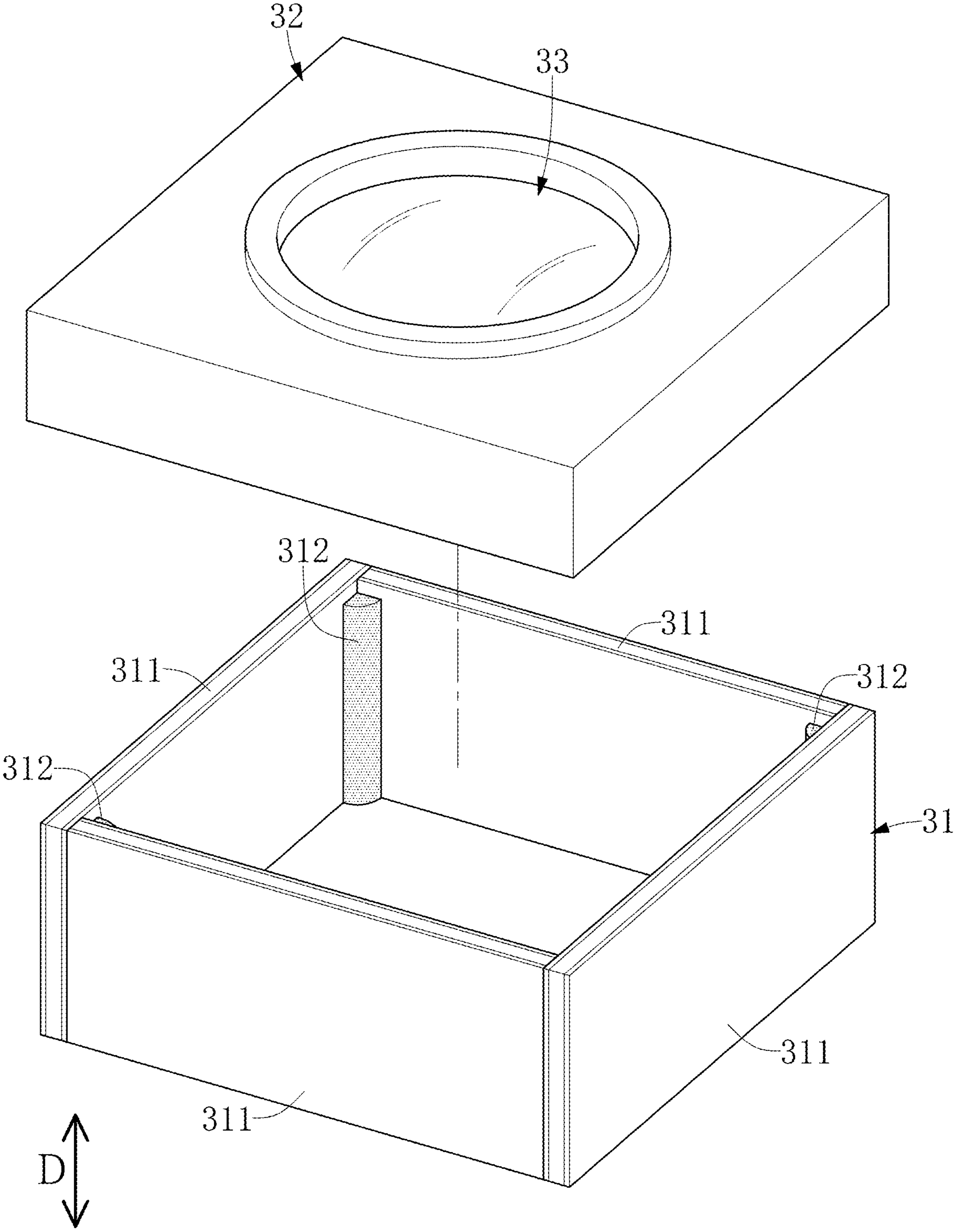
FIG. 3 is a schematic exploded view showing a lens lid of FIG. 2.
Figure 4:
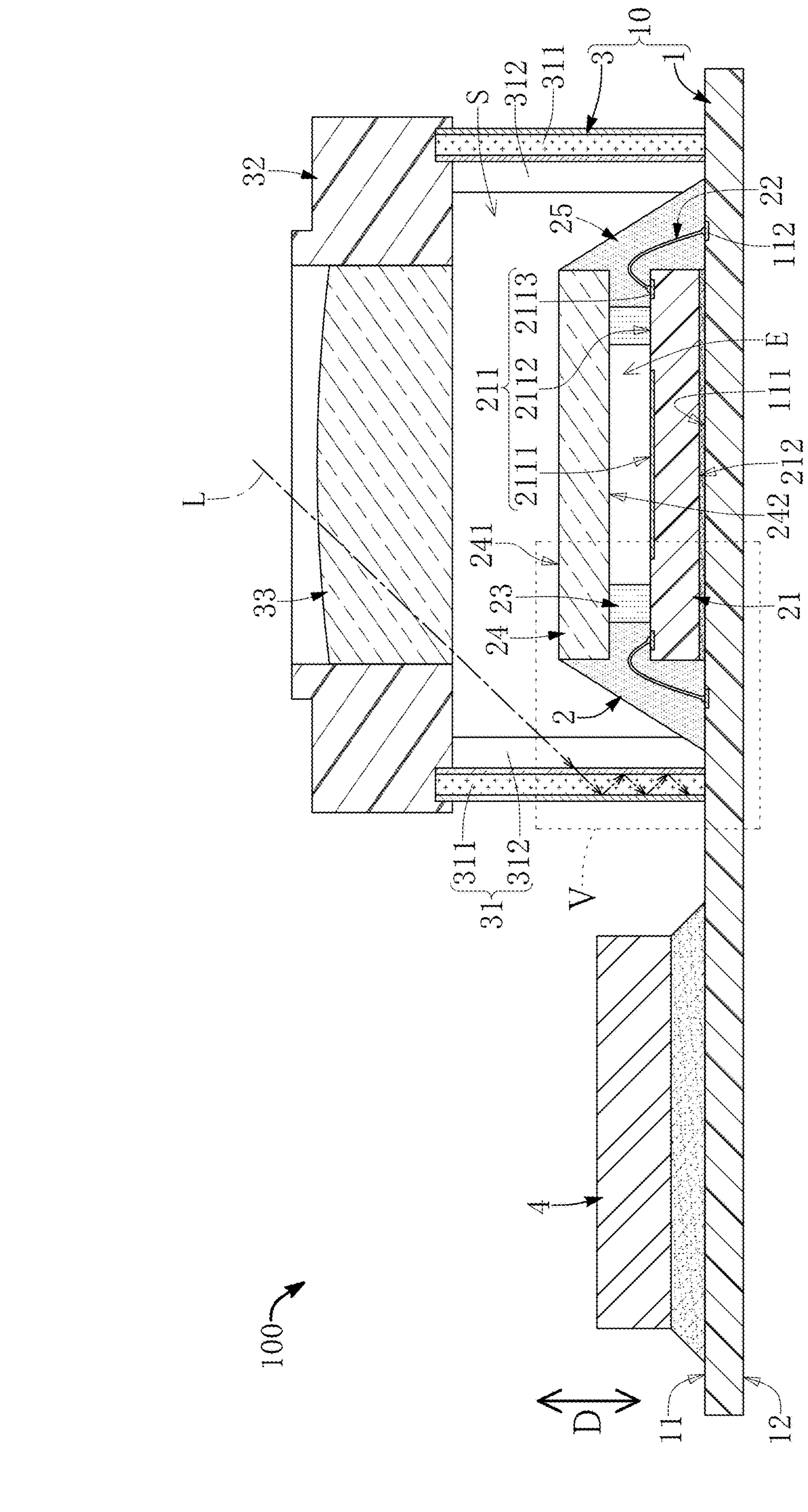
FIG. 4 is a schematic cross-sectional view taken along line IV-IV of FIG. 1.
Figure 5:
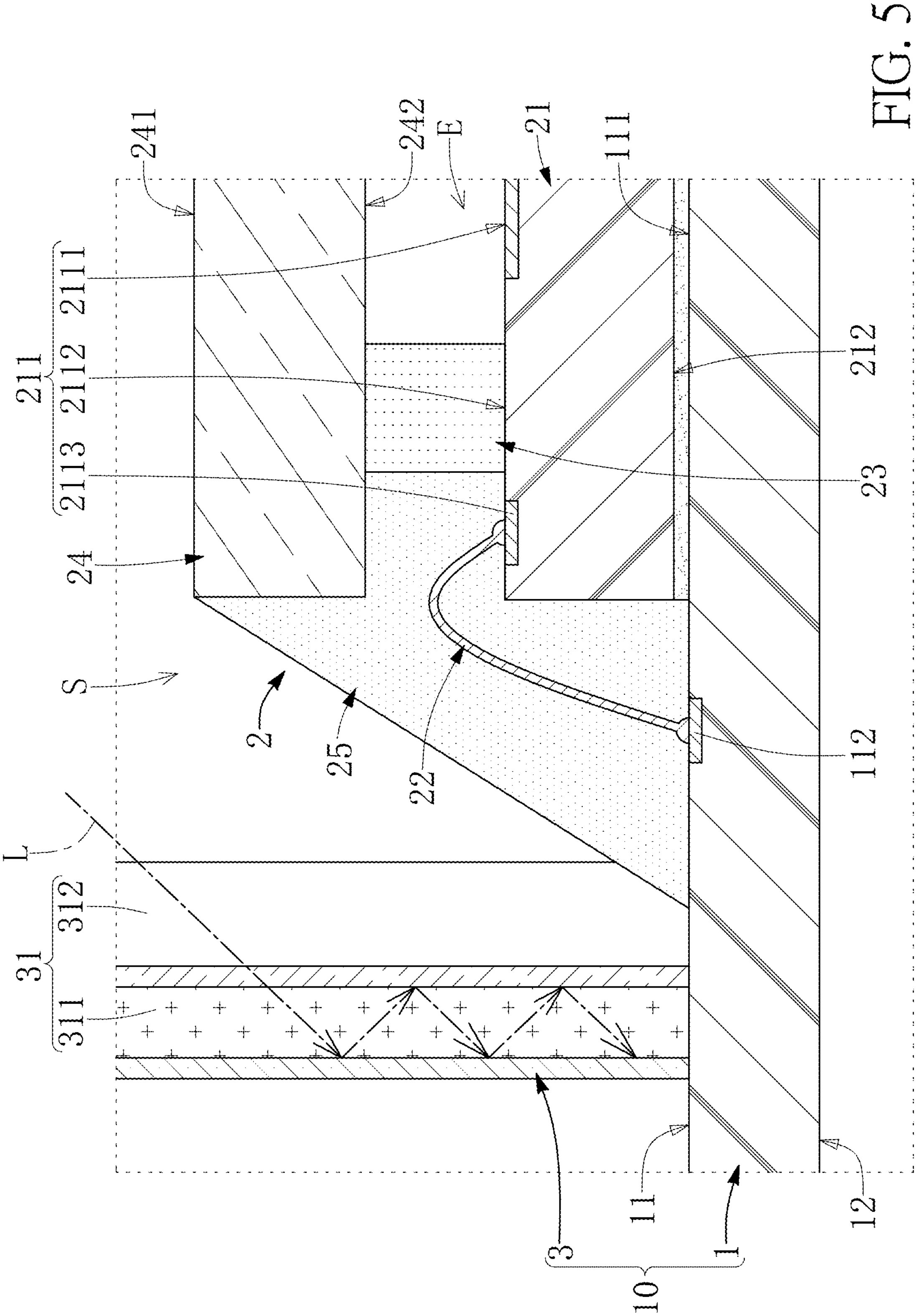
FIG. 5 is a schematic enlarged view of part V of FIG. 4.

Referring to FIG. 1 to FIG. 7, an embodiment of the present disclosure is provided. As shown in FIG. 1 to FIG. 3, the present embodiment provides a sensor lens assembly 100, which includes a circuit board 1, a sensing module 2 mounted on the circuit board 1, a lens lid 3 fixed onto the circuit board 1 and covering the sensing module 2, and at least one electronic component 4 that is mounted on the circuit board 1 and that is arranged outside of the lens lid 3, but the present disclosure is not limited thereto.

In the present embodiment, the sensor lens assembly 100 is provided with the above components, and the circuit board 1 and the lens lid 3 can be jointly defined as a housing 10, but the sensor lens assembly 100 can be adjusted or changed according to practical requirements. For example, in other embodiments of the present disclosure not shown in the drawings, the at least one electronic component 4 of the sensor lens assembly 100 can be omitted; or, the housing 10 of the sensor lens assembly 100 can be independently used (e.g., sold) or can be used in cooperation with other components.

As shown in FIG. 4 to FIG. 7, the circuit board 1 of the present embodiment can be a printed circuit board (PCB) or a flexible printed circuit (FPC), but the present disclosure is not limited thereto. The circuit board 1 has a first surface 11 and a second surface 12 that is opposite to the first surface 11. The first surface 11 of the circuit board 1 includes a chip-bonding region 111 and a plurality of bonding pads 112 that are arranged adjacent to the chip-bonding region 111. The bonding pads 112 are arranged outside of the chip-bonding region 111, and the bonding pads 112 in the present embodiment are in a ring-shaped arrangement, but the present disclosure is not limited thereto. For example, in other embodiments of the present disclosure not shown in the drawings, the bonding pads 112 can be arranged in two rows respectively at two opposite sides of the chip-bonding region 111.

In addition, the circuit board 1 further allows an electrical connector (not shown in the drawings) to be mounted thereon, so that the circuit board 1 can be detachably connected to an electronic device (not shown in the drawings) through the electrical connector, thereby enabling the sensor lens assembly 100 to be assembled on and electrically coupled to the electronic device.

The sensing module 2 includes a sensor chip 21 mounted on the circuit board 1, a plurality of metal wires 22 electrically coupled to the sensor chip 21 and the circuit board 1, a ring-shaped supporting layer 23 disposed on the sensor chip 21, a light-permeable layer 24 disposed on the ring-shaped supporting layer 23, and an encapsulant 25 that is formed on the circuit board 1.

It should be noted that the sensing module 2 in the present embodiment includes the above components, but the sensing module 2 can be adjusted or changed according to design requirements. For example, in other embodiments of the present disclosure not shown in the drawings, the sensing module 2 can be provided without the metal wires 22 and/or the encapsulant 25, and the sensor chip 21 can be fixed onto and electrically coupled to the circuit board 1 in a flip-chip manner or an adhering manner.

The sensor chip 21 preferably has a square shape or a rectangular shape having a plurality of corners 213, and the sensor chip 21 in the present embodiment is an image sensor chip, but the present disclosure is not limited thereto. A bottom surface 212 of the sensor chip 21 is fixed onto the chip-bonding region 111 of the circuit board 1 (through a chip-bonding adhesive) along a predetermined direction D. In other words, the sensor chip 21 is arranged to be surrounded on the inside of the bonding pads 112.

Moreover, a top surface 211 of the sensor chip 21 has a sensing region 2111 and a carrying region 2112 that has a ring shape arranged around the sensing region 2111. Two ends of each of the metal wires 22 are respectively connected to the circuit board 1 and the carrying region 2112 of the sensor chip 21, so that the circuit board 1 and the sensor chip 21 are electrically coupled to each other.

Specifically, the sensor chip 21 includes a plurality of connection pads 2113 arranged on the carrying region 2112. In other words, the connection pads 2113 are arranged outside of the sensing region 2111. The quantity and positions of the connection pads 2113 of the sensor chip 21 in the present embodiment correspond to those of the bonding pads 112 of the circuit board 1. In other words, the connection pads 2113 in the present embodiment are substantially in a ring-shaped arrangement. Moreover, the two ends of each of the metal wires 22 are respectively connected to one of the bonding pads 112 and the corresponding connection pad 2113.

Figure 6:
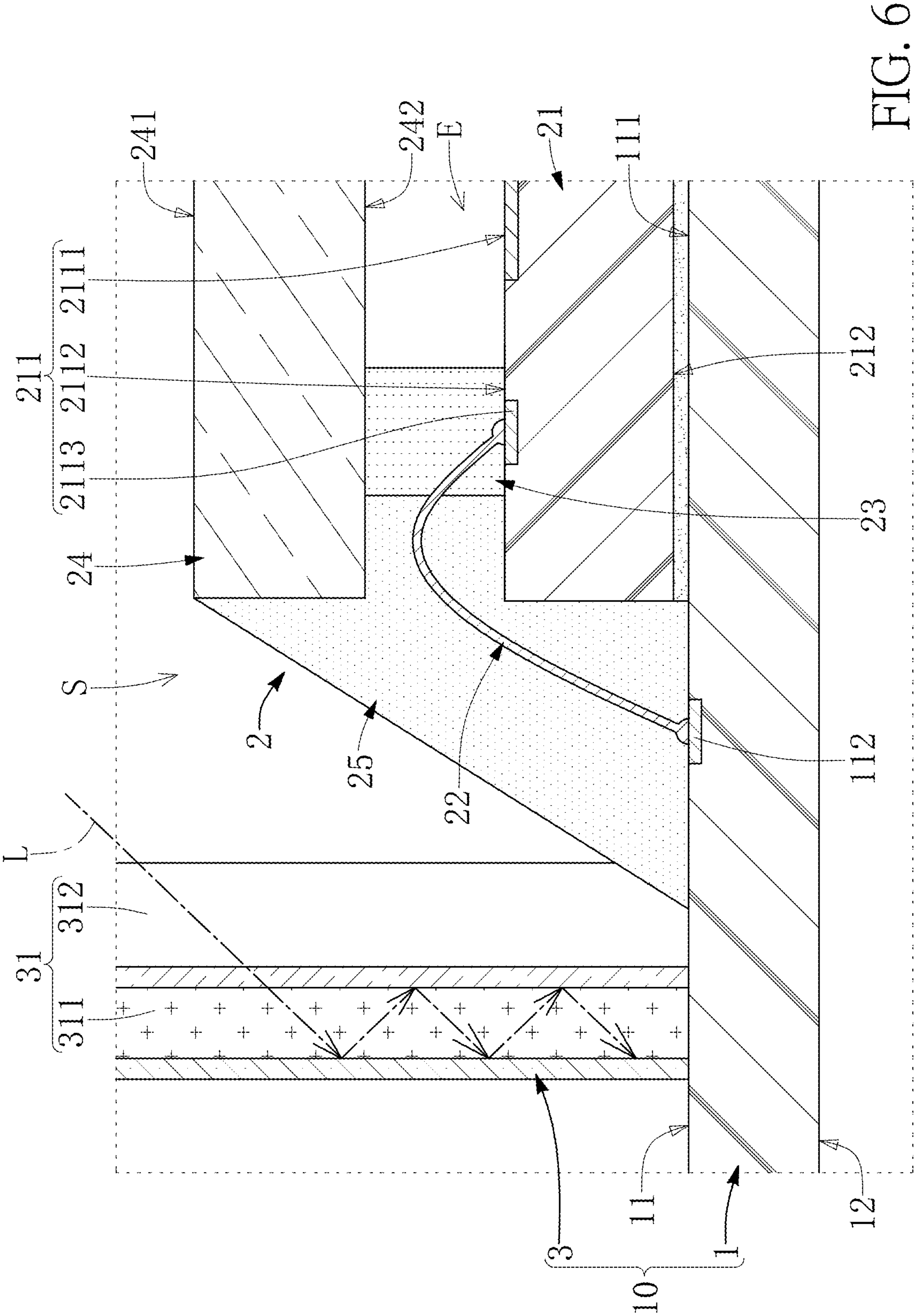
FIG. 6 is a schematic enlarged view showing another configuration of FIG. 5.
Figure 7:
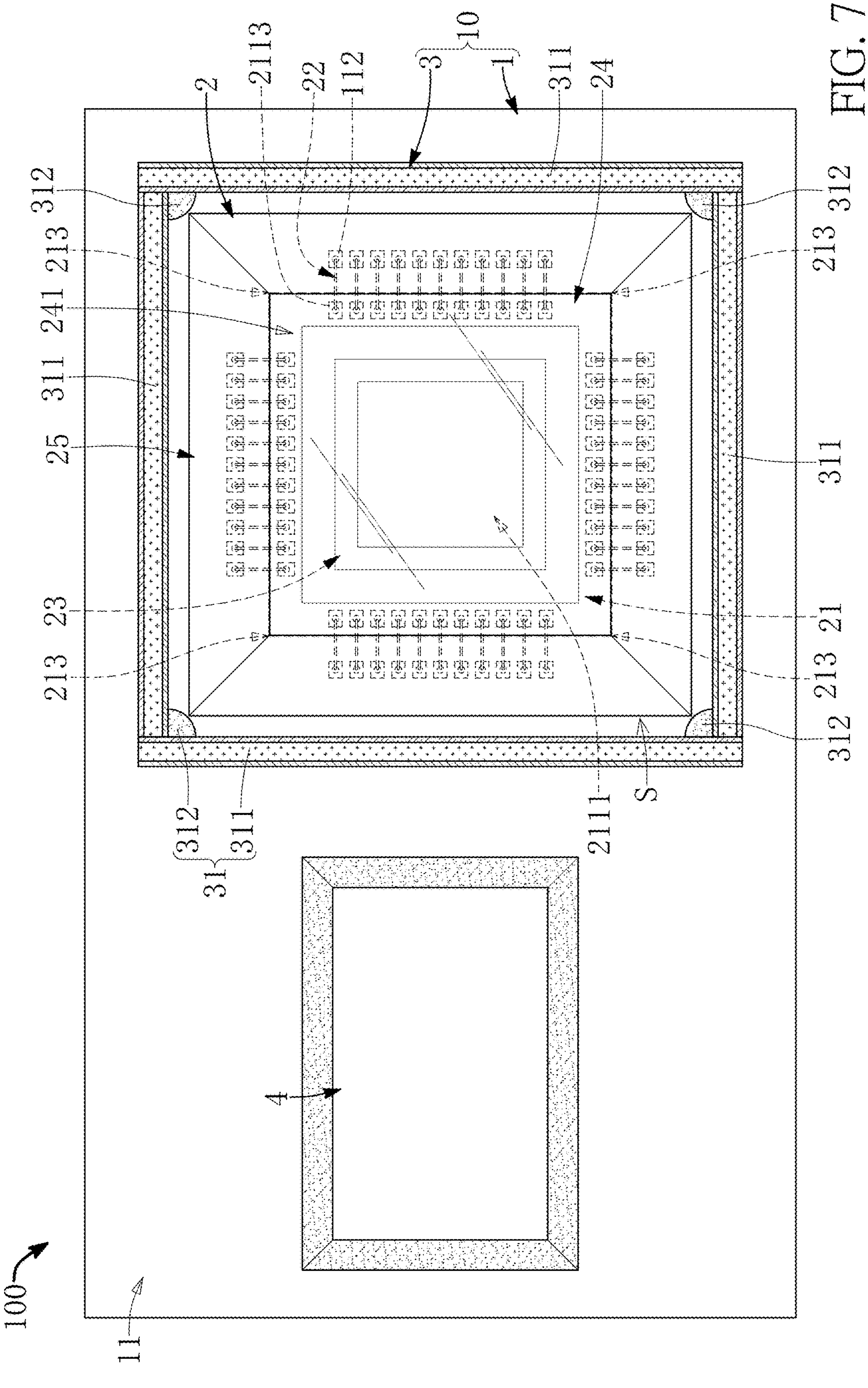
FIG. 7 is a schematic cross-sectional view taken along line VII-VII of FIG. 1.

The ring-shaped supporting layer 23 is disposed on the carrying region 2112 of the sensor chip 21 and surrounds the sensing region 2111. In the present embodiment, the ring-shaped supporting layer 23 is located at an inner side of the metal wires 22 and is not in contact with any one of the metal wires 22 (e.g., each of the metal wires 22 is located outside of the ring-shaped supporting layer 23 and is entirely embedded in the encapsulant 25), but the present disclosure is not limited thereto. For example, as shown in FIG. 6, a part of each of the metal wires 22 is embedded in the ring-shaped supporting layer 23, and another part of each of the metal wires 22 is embedded in the encapsulant 25.

The light-permeable layer 24 in the present embodiment is a transparent and flat glass board, but the present disclosure is not limited thereto. The light-permeable layer 24 has an outer surface 241 and an inner surface 242 that is opposite to the outer surface 241. The light-permeable layer 24 (e.g., the inner surface 242) is disposed on the ring-shaped supporting layer 23, so that the inner surface 242 of the light-permeable layer 24, the ring-shaped supporting layer 23, and the top surface 211 of the sensor chip 21 jointly define an enclosed space E.

The encapsulant 25 of the present embodiment is opaque for blocking visible light from passing therethrough. The encapsulant 25 is a solidified liquid encapsulation and is formed on the first surface 11 of the circuit board 1, and edges of the encapsulant 25 are arranged adjacent to edges of the circuit board 1. The sensor chip 21, the ring-shaped supporting layer 23, the light-permeable layer 24, and at least part of each of the metal wires 3 are embedded in the encapsulant 6, and at least part of the outer surface 241 of the light-permeable layer 24 is exposed from the encapsulant 25, but the present disclosure is not limited thereto.

The lens lid 3 and the circuit board 1 jointly define an enclosed arrangement space S that receives the sensing module 2 (and the bonding pads 112) therein. Moreover, the at least one electronic component 4 is located outside of the enclosed arrangement space S and is electrically coupled to the sensing module 2 through the circuit board 1, but the present disclosure is not limited thereto.

Specifically, the lens lid 3 includes a bottom frame 31, a top frame 32 fixed to the bottom frame 31, and at least one lens 33 assembled in the top frame 31. The fixing manner between the bottom frame 31 and the top frame 32 can be adjusted or changed according to practical requirements. For example, the bottom frame 31 and the top frame 32 can be engaged and adhered to each other for being fixed with each other.

Moreover, the bottom frame 31 is fixed onto the circuit board 1 and includes at least one one-way mirror 311. The sensing module 2 is located in a space surrounded by the at least one one-way mirror 311, and the sensing module 2 (e.g., the encapsulant 25) is preferably not in contact with the at least one one-way mirror 311.

In summary, when light L travels into the at least one one-way mirror 311 by passing through the at least one lens 311 and the enclosed arrangement space S, the light L is reflected in the at least one one-way mirror 311 for multiple times. Accordingly, after the light L traveling in the enclosed arrangement space S enters into the at least one one-way mirror 311 (from an inner side of the at least one one-way mirror 311), the light L is limited and restricted in the at least one one-way mirror 311, thereby effectively preventing a flare phenomenon from being generated. In addition, external light cannot enter into the enclosed arrangement space S by passing through an outer side of the at least one one-way mirror 311.

In the present embodiment, the lens lid 3 is fixed onto the first surface 11 of the circuit board 1 by using the at least one one-way mirror 311 to adhere to the circuit board 1, and the inner side and the outer side of the at least one one-way mirror 311 are provided without any component being disposed thereon. In other words, the at least one one-way mirror 311 can be used to support the top frame 32 and the at least one lens 33, and the at least one lens 33 faces toward the sensing region 2111.

It should be noted that the bottom frame 31 can have a plurality of various configurations according to practical requirements. In order to clearly realize the present embodiment, the following description describes a preferred one of the configurations of the bottom frame 31. In the present embodiment, the bottom frame 31 further includes a plurality of light-absorption adhesives 312, a quantity of the at least one one-way mirror 311 in the bottom frame 31 is more than one, and the one-way mirrors 311 are connected to be jointly formed as a ring-shaped structure (through the light-absorption adhesives 312).

Specifically, any two of the one-way mirrors 311 connected to each other have a connection interface that is provided with one of the light-absorption adhesives 312 adhered onto inner sides thereof, and the corners 213 of the sensor chip 21 respectively correspond in position to the light-absorption adhesives 312, but the present disclosure is not limited thereto. For example, in other embodiments of the present disclosure not shown in the drawings, any two of the one-way mirrors 311 can be connected to each other in other manners; or, the quantity of the at least one one-way mirror 311 in the bottom frame 31 can be only one, and the one-way mirror 311 can be ring-shaped for omitting the light-absorption adhesives 312.

Beneficial Effects of the Embodiment

In conclusion, any one of the sensor lens assembly and the housing in the present disclosure is provided with the at least one one-way mirror, so that after the light traveling in the enclosed arrangement space enters into the at least one one-way mirror, the light is limited and restricted in the at least one one-way mirror, thereby effectively preventing a flare phenomenon from being generated.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensor lens assembly, comprising:

a circuit board;

a sensing module including:

a sensor chip mounted on and electrically coupled to the circuit board, wherein a top surface of the sensor chip has a sensing region and a carrying region that is arranged outside of the sensing region;

a ring-shaped supporting layer being a ring-shaped structure that is disposed on the carrying region and that surrounds the sensing region; and a light-permeable layer disposed on the ring-shaped supporting layer;

a lens lid including:

a bottom frame fixed onto the circuit board and including at least one one-way mirror, wherein the at least one one-way mirror is a ring-shaped structure that surrounds the sensing module;

a top frame fixed to the bottom frame; and at least one lens assembled in the top frame and facing toward the sensing region, wherein the lens lid and the circuit board jointly define an enclosed arrangement space that receives the sensing module therein;

wherein, when light travels into the at least one one-way mirror by passing through the at least one lens and the enclosed arrangement space, the light is reflected in the at least one one-way mirror for multiple times.

2. The sensor lens assembly according to claim 1, wherein a quantity of the at least one one-way mirror is more than one, and wherein the one-way mirrors are connected to be jointly formed as the ring-shaped structure.

3. The sensor lens assembly according to claim 2, wherein the bottom frame includes a plurality of light-absorption adhesives, and any two of the one-way mirrors connected to each other have a connection interface that is provided with one of the light-absorption adhesives adhering to inner sides thereof.

4. The sensor lens assembly according to claim 3, wherein the sensor chip has a plurality of corners respectively corresponding in position to the light-absorption adhesives.

5. The sensor lens assembly according to claim 1, wherein the sensing module includes an encapsulant formed on the circuit board, and wherein the sensor chip, the ring-shaped supporting layer, and the light-permeable layer are embedded in the encapsulant, and at least part of an outer surface of the light-permeable layer is exposed from the encapsulant.

6. The sensor lens assembly according to claim 5, wherein the sensing module includes a plurality of metal wires each having two ends that are respectively connected to the circuit board and the sensor chip, and wherein each of the metal wires is at least partially embedded in the encapsulant.

7. A housing of a sensor lens assembly, comprising:

a circuit board; and a lens lid including:

a bottom frame fixed onto the circuit board and including at least one one-way mirror, wherein the at least one one-way mirror is a ring-shaped structure;

a top frame fixed to the bottom frame; and at least one lens assembled in the top frame, wherein the lens lid and the circuit board jointly define an enclosed arrangement space;

wherein, when light travels into the at least one one-way mirror by passing through the at least one lens and the enclosed arrangement space, the light is reflected in the at least one one-way mirror for multiple times.

8. The housing of the sensor lens assembly according to claim 7, wherein a quantity of the at least one one-way mirror is more than one, and wherein the one-way mirrors are connected to be jointly formed as the ring-shaped structure.

9. The housing of the sensor lens assembly according to claim 8, wherein the bottom frame includes a plurality of light-absorption adhesives, and any two of the one-way mirrors connected to each other have a connection interface that is provided with one of the light-absorption adhesives adhering to inner sides thereof.

10. The housing of the sensor lens assembly according to claim 7, wherein the circuit board includes a plurality of bonding pads arranged in the enclosed arrangement space.

* * * * *